United States Patent [19]

Menon

[11] Patent Number: 4,583,606
[45] Date of Patent: Apr. 22, 1986

[54] LOAD CELL WITH LATERAL RESTRAINING MEMBER

[75] Inventor: Narandranath Menon, Arlington, Tex.

[73] Assignee: General Electrodynamics Corporation, Arlington, Tex.

[21] Appl. No.: 577,087

[22] Filed: Feb. 6, 1984

[51] Int. Cl.[4] .............................................. G01G 5/04
[52] U.S. Cl. ..................................... 177/208; 177/254
[58] Field of Search ................ 177/208, 154, 255, 254

[56] References Cited

U.S. PATENT DOCUMENTS

| | | | |
|---|---|---|---|
| 3,147,616 | 9/1964 | Rome | 177/208 X |
| 3,339,650 | 9/1967 | Carr | 177/208 X |
| 3,371,732 | 3/1968 | Stein | 177/208 |

Primary Examiner—George H. Miller, Jr.
Attorney, Agent, or Firm—Jerry W. Mills; Gregory M. Howison

[57] ABSTRACT

A load cell includes a base (40) with a cavity (42) formed therein. A diaphragm (46) is disposed over the cavity (42) to form a chamber (48) that is filled with hydraulic fluid. A piston formed of two halves (60) and (62) is disposed adjacent the surface of the diaphragm (46). A high tensile strength resilient membrane (58) is disposed between the two halves (60) and (62) of the piston and secured thereto with bolts (64) and (66). A securing ring (68) secures the diaphragm (46) around the periphery thereof to the base (40). A securing ring (72) secures the peripheral edge of the membrane (58) to the securing ring (68). The membrane (58) provides tension forces about the periphery of the piston to impede lateral movement thereof to maintain the piston in the center of the cavity (42).

1 Claim, 2 Drawing Figures

LOAD CELL WITH LATERAL RESTRAINING MEMBER

TECHNICAL FIELD

The present invention pertains in general to load cells and, more particularly, to load cells with apparatus for restraining the movement thereof in the lateral direction with respect to the piston.

BACKGROUND OF THE INVENTION

To obtain a weight measurement in the field on vehicles such as commercial trucks and airplanes requires the use of a portable scale. These portable scales utilize relatively low profile load cells therein that are normally comprised of a piston that interacts with a diaphragm that is part of a hydraulic chamber. In the static condition, the weight disposed on the piston is evenly dispersed over the diaphragm and the piston is stationary. However, when moving the vehicle onto the scale, there are a number of undesirable forces that can be transmitted to the load cells in the scale. These result from forces directed to the surface of the load cell that are off normal, that is, at an angle with respect to the perpendicular. These forces can cause the piston to exert a strong lateral force against the diaphragm which can cause damage to the load cell. In addition, the piston can be moved off center with respect to the hydraulic chamber, thus resulting in inaccurate measurements in that most load cells are designed and calibrated with the piston in the center thereof.

One approach to solving the problem of centering the piston in a load cell is disclosed in U.S. Pat. No. 3,633,695 issued to C. D. Bradley. The Bradley device utilizes a bridge ring on the upper and lower peripheries of a floating piston. The bridge rings are fabricated from hardened steel with a series of slots formed about the periphery thereof. The bridge ring imparts a compressive force to the piston to maintain centering thereof. Other centering techniques are disclosed in U.S. Pat. No. 3,354,973 and U.S. Pat. No. 2,652,241. All of the centering techniques require some form of spacer that provides the opposing force with some compression thereof to provide a certain amount of movement.

In view of the present methods for centering the piston in the load cell and resisting lateral forces thereon, there exists a need for a load cell having a self-centering piston that is not subject to damage upon incurring severe lateral forces and which is easily assembled.

SUMMARY OF THE INVENTION

The present invention disclosed and claimed herein comprises a load cell that includes a base having an open cavity formed in one surface thereof with a diaphragm disposed over the cavity to form a sealed chamber. The sealed chamber is filled with a hydraulic fluid. A piston is disposed on the surface of the diaphragm external to the chamber to disperse external forces across the surface of the diaphragm. A restraining member is disposed around the periphery of the piston to restrain lateral movement thereof and provides only tension forces to the piston and not compressive forces. A pressure transducer is provided in communication with the sealed chamber to measure the pressure of the hydraulic fluid therein.

In yet another embodiment of the present invention, the piston is formed of two halves with a layer of high tensile strength resilient material disposed between the two halves with the two halves secured thereon. The periphery of the layer is clamped to the surface of the base with the surface of the piston disposed adjacent the diaphragm. The resilient layer is clamped such that the tensile forces imparted to the periphery of the piston are essentially in a plane parallel to the surface of the diaphragm.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
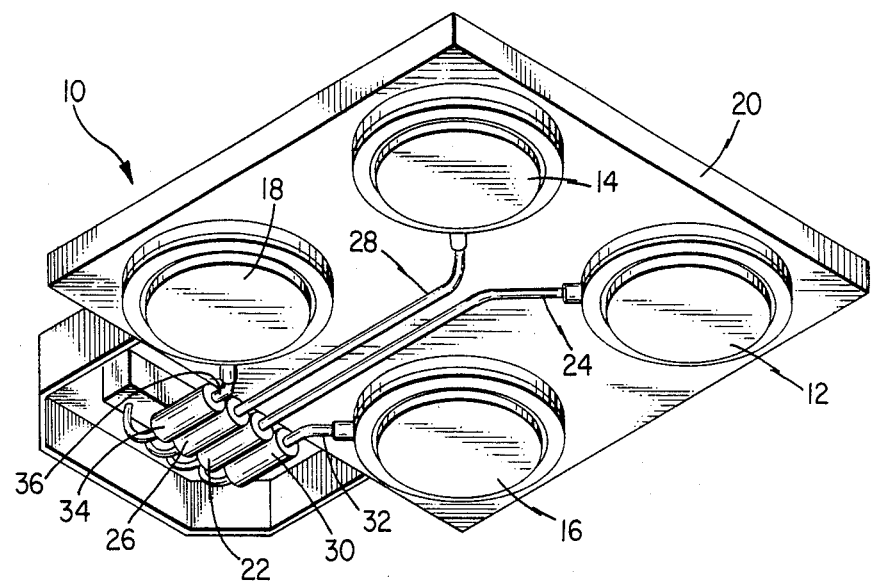
FIG. 1 illustrates a perspective view of a scale utilizing the load cells of the present invention.

Referring now to FIG. 1, there is illustrated a perspective view of a portable scale 10 for weighing vehicles and the such. The scale includes four hydraulic chambers or load cells 12, 14, 16 and 18 mounted on the lower surface of a force spreading plate 20. The hydraulic chambers 12–18 are arranged in an array such that a force applied to the force spreading plate 20 is essentially distributed between the hydraulic chambers 12–18. Although not shown, the apparatus 10 is disposed on a base or other suitable surface for supplying an opposing force to each of the hydraulic chambers 12–18.

The hydraulic chamber 12 is connected to a pressure transducer 22 through a conduit 24, the hydraulic chamber 14 is connected to a pressure transducer 26 through a conduit 28, the hydraulic chamber 16 is connected to a pressure transducer 30 through a conduit 32 and the hydraulic chamber 18 is connected to a pressure transducer 34 through a conduit 36. The pressure transducers 22, 26, 30 and 34 are operable to convert pressure within the hydraulic chambers 12–18 to an electrical signal to indicate pressure.

Figure 2:
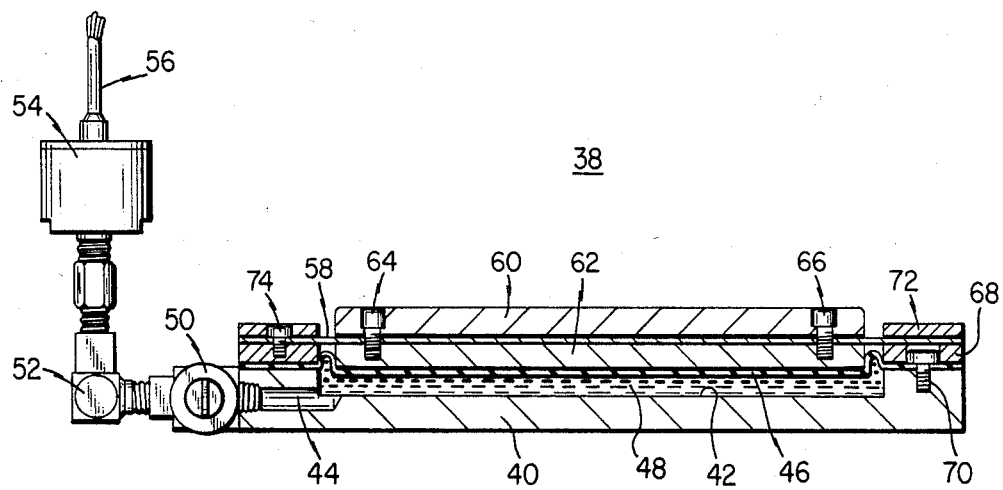
FIG. 2 illustrates a cross-sectional view of one of the load cells on the scale of FIG. 1.

Referring now to FIG. 2, there is illustrated a cross-sectional diagram of a load cell 38 that is similar to the combination of the hydraulic chamber 12, the pressure transducer 22 and the connecting conduit 24. It should be understood that all of the hydraulic chambers 12–18 and their respective pressure transducers and connecting conduits are, in combination, all similar to the load cell 38. The load cell 38 includes a base 40 having a cavity 42 formed therein. A channel 44 is machined into the base 40 connecting the exterior surface thereof with the cavity 42. A diaphragm 46 is disposed on the upper surface of the base 40 in which the cavity 42 is formed to form a chamber 48. The chamber 48 is a sealed chamber that only communicates with the exterior thereof through the channel 44.

An output connector 50 is threadedly engaged with the channel 44 on the exterior of the base 40. The output connector 50 is threadedly engaged with an elbow connector 52 and the elbow connector 52 is threadedly engaged with a pressure transducer 54. The pressure transducer 54, the connectors 50 and 52 and the chamber 48, in combination, form a sealed chamber that is filled with hydraulic fluid. The pressure transducer 54 is operable to translate the pressure imparted to the hydraulic fluid in the chamber 48 from the diaphragm 46 to an electrical signal. This electrical signal is transmitted along a cable 56 from the transducer 54. Since the hydraulic fluid in the chamber 48 is a relatively incompressible fluid, minimal displacement of the diaphragm is experienced due to fluid compression. However, the diaphragm 46 is a convoluted diaphragm and expands around the periphery thereof to provide some displacement.

A high tensile strength resilient membrane 58 is disposed between an upper piston half 60 and a lower piston half 62. The upper piston half 60 is attached to the lower piston half 62 by the use of bolts 64 and 66. The piston halves 60 and 62 are cylindrical in shape and the cavity 42 is also cylindrical in shape. In the preferred embodiment, there are six additional bolts similar to the bolts 64 and 66 disposed around the periphery of the upper half 64 securing the two piston halves 60 and 62 together.

A securing ring 68 is disposed over the portion of the diaphragm 46 that extends beyond the confines of the cavity 42 and that is adjacent the upper surface of the base 40. The securing ring 68 is connected to the base 40 by a bolt 70. In the preferred embodiment, there are eleven additional bolts identical to the bolts 70 disposed about the periphery of the securing ring 68 for securing the peripheral edge of the diaphragm 46 to the upper surface of the base 40. In this manner, a seal is formed between the base 40 and the diaphragm 46 to prevent hydraulic fluid disposed in the chamber 48 from escaping therefrom.

The membrane 58 has the peripheral edge thereof disposed adjacent the upper surface of the securing ring 68. A securing ring 72 is disposed over the peripheral edge of the membrane 58 and is secured to the securing ring 68 with a bolt 74. In the preferred embodiment, there are eleven additional bolts identical to the bolt 74 disposed about the periphery of the securing ring 72. The securing ring 72 has the width thereof dimensioned similar to the width of the securing ring 68.

The membrane can be fabricated from several materials that combine high tensile strength and flexibility. A nylon fabric coated with rubber will provide the necessary properties for the membrane 58.

The membrane 58 is operable to provide tensile forces only between the securing rings 68 and 72 and the piston halves 60 and 62. Since the membrane 58 is not stretched tightly around the periphery thereof, a small amount of displacement is experienced in the chamber 48. This results in a downward movement of the piston halves 60 and 62. The membrane 58 sufficiently yields to allow this displacement. However, when a force is directed on the surface of the upper piston half 60 that is at an angle to the normal therewith, a force component results that is parallel to the piston halves 60 and 62. Without the membrane 58, the piston halves 60 and 62 can shift off center with respect to the chamber 48. The membrane 58 provides a tensile force that prevents this movement while the compressive forces on the diametrically opposite side of the piston halves 60 and 62 provide minimal force thereto. This prevents lateral movement which could result in an inaccurate measurement. Alternately, a lateral force component could cause the piston halves 60 and 62 to damage the diaphragm 46. It is desirable to have the piston halves 60 and 62 centered over the cavity 42 at all times and maintained in a plane that is essentially parallel to the membrane 58. In this manner, the force imparted to the membrane 58 by the piston halves 60 and 62 is evenly distributed over the surface thereof without changing the calibration thereof.

Since the piston halves 60 and 62 displace the membrane 58 downward due to the use of the convoluted diaphragm 46, the membrane 58 must flex to a certain degree. Depending upon the forces incurred on the surface of the piston halves 60 and 62, the displacement thereof will vary slightly. Therefore, it is necessary to insure that the displacement of the piston halves 60 and 62 is not impeded. During the securing of the peripheral edge of the membrane 58 to the securing ring 68, a force equivalent to the maximum force that will be incurred by the piston halves 60 and 62 is applied to the surface of the piston half 60, thereby causing a displacement in the membrane 58. The securing ring 72 is then secured over the peripheral edge of the membrane 58. This, in effect, places the proper amount of displacement and deformation in the membrane 58.

In summary, there has been provided a load cell with a centering mechanism for centering the piston about a hydraulic chamber. The load cell includes a base with a cavity formed therein and a convoluted diaphragm disposed thereover. The membrane and the cavity form a sealed chamber that is filled with hydraulic fluid. A piston formed of two halves is disposed over the center of the cavity adjacent the diaphragm. A high tensile strength resilient membrane is disposed between the two halves of the piston and secured around the periphery thereof to the base. The membrane provides a tensile force about the periphery of the piston that impedes lateral movement due to forces that are off axis with respect to the normal to the piston. The forces imparted by the membrane are tensile forces rather than compressive forces. These forces are directed essentially along the lateral direction to the piston.

Although the preferred embodiment has been described in detail, it should be understood that various changes, substitutions and alterations can be made therein without departing from the spirit and scope of the invention as defined by the appended claims.

What is claimed is:

1. A load cell, comprising:
 a rectangular base having a cylindrical open-faced cavity formed in one surface thereof;
 a convoluted diaphragm disposed over said cavity to form a sealed chamber, said sealed chamber filled with hydraulic fluid;
 a pressure transducer in communication with said sealed chamber for measuring pressure of said hydraulic fluid resulting from external forces applied to said diaphragm;
 a piston having a first half and a second half and dimensioned to be disposed adjacent said diaphragm;
 a layer of high tensile strength resilient material disposed between the first and second halves of said pistons and dimensioned to extend beyond the periphery of the first and second halves of said piston;
 first means for clamping the first and second halves of said piston together to secure said resilient layer;
 second means for clamping the periphery of said resilient layer on the surface of said base such that one of the first and second halves of said piston are disposed adjacent said diaphragm such that said resilient layer is disposed in a plane parallel to said diaphragm and the surface of said piston to provide tension forces to the periphery of said piston when said piston incurs forces on the surface thereof that are disposed at an angle to the normal thereof, said resilient layer clamped under maximum load such that said resilient layer is pre-deformed.

* * * * *